(12) United States Patent
Buri et al.

(10) Patent No.: US 12,084,589 B2
(45) Date of Patent: Sep. 10, 2024

(54) USE OF ADDITIVES CONTAINING PRIMARY ALKANOLAMINES IN AQUEOUS MINERAL SUSPENSIONS

(71) Applicant: OMYA INTERNATIONAL AG, Oftringen (CH)

(72) Inventors: Matthias Buri, Rothrist (CH); Samuel Rentsch, Spiegel bei Bern (CH); Fabio Ippolito, Vordemwald (CH)

(73) Assignee: OMYA International AG, Oftringen (CH)

( * ) Notice: Subject to any disclaimer, the term of this patent is extended or adjusted under 35 U.S.C. 154(b) by 895 days.

(21) Appl. No.: 17/047,342

(22) PCT Filed: Apr. 16, 2019

(86) PCT No.: PCT/EP2019/059769
§ 371 (c)(1),
(2) Date: Oct. 13, 2020

(87) PCT Pub. No.: WO2019/206737
PCT Pub. Date: Oct. 31, 2019

(65) Prior Publication Data
US 2021/0139734 A1    May 13, 2021

(30) Foreign Application Priority Data

Apr. 23, 2018   (EP) .................... 18168806

(51) Int. Cl.
*C09D 17/00*   (2006.01)
*C09C 1/02*    (2006.01)
(Continued)

(52) U.S. Cl.
CPC ............ *C09D 17/001* (2013.01); *C09C 1/021* (2013.01); *C09C 1/42* (2013.01); *C09D 7/61* (2018.01);
(Continued)

(58) Field of Classification Search
CPC .......... C09D 17/001; C09D 7/65; C09D 7/61; C09D 7/63; C09D 17/004; C09D 17/007;
(Continued)

(56) References Cited

U.S. PATENT DOCUMENTS

| | | | |
|---|---|---|---|
| 6,991,705 B2 | 1/2006 | Leino et al. | |
| 2009/0162638 A1* | 6/2009 | Buri | C09B 67/0013 428/407 |

(Continued)

FOREIGN PATENT DOCUMENTS

| | | |
|---|---|---|
| EP | 1795502 A1 | 6/2007 |
| EP | 2281853 A1 | 2/2011 |

(Continued)

OTHER PUBLICATIONS

International Search Report and Written Opinion for PCT Application No. PCT/EP2019/059769, Mailed May 15, 2019, 14 pages.

*Primary Examiner* — John E Uselding
(74) *Attorney, Agent, or Firm* — Lippes Mathias LLP (57) ABSTRACT

The present invention relates to the technical domain of additives for aqueous high solids suspensions of mineral materials. The inventive additive comprises specific primary amines and is used for increasing the pH-value of the suspension and/or for increasing the wettability of the mineral materials.

22 Claims, 2 Drawing Sheets viscosity-change of high solids suspension in relation to amount of MIPA (51) Int. Cl.
- *C09C 1/42* (2006.01)
- *C09D 7/61* (2018.01)
- *C09D 7/63* (2018.01)
- *C09D 7/65* (2018.01)
- *D21H 17/07* (2006.01)
- *D21H 17/37* (2006.01)
- *D21H 17/67* (2006.01)
- *D21H 17/68* (2006.01)
- *D21H 19/12* (2006.01)
- *D21H 21/28* (2006.01)
- *C08K 3/26* (2006.01)
- *C08K 3/34* (2006.01)
- *C08K 5/17* (2006.01)
- *C08K 13/02* (2006.01)

(52) U.S. Cl.
CPC ............... *C09D 7/63* (2018.01); *C09D 7/65* (2018.01); *C09D 17/004* (2013.01); *C09D 17/007* (2013.01); *D21H 17/07* (2013.01); *D21H 17/37* (2013.01); *D21H 17/675* (2013.01); *D21H 17/68* (2013.01); *D21H 19/12* (2013.01); *D21H 21/285* (2013.01); *C01P 2006/10* (2013.01); *C08K 2003/265* (2013.01); *C08K 3/346* (2013.01); *C08K 5/17* (2013.01); *C08K 13/02* (2013.01); *C08K 2201/002* (2013.01)

(58) Field of Classification Search
CPC .......... C09C 1/021; C09C 1/42; D21H 17/07; D21H 17/37; D21H 17/675; D21H 17/68; D21H 19/12; D21H 21/285
See application file for complete search history.

(56) References Cited

U.S. PATENT DOCUMENTS

| | | |
|---|---|---|
| 2012/0256140 A1 | 10/2012 | Buri et al. |
| 2013/0192784 A1 | 8/2013 | Buri et al. |
| 2013/0296469 A1* | 11/2013 | Blossom, III .......... C08K 3/346 524/186 |

FOREIGN PATENT DOCUMENTS

| | | |
|---|---|---|
| EP | 2392622 A1 | 7/2011 |
| EP | 2354191 A1 | 8/2011 |
| EP | 2371766 A1 | 10/2011 |
| EP | 2447213 A1 | 5/2012 |
| EP | 2524898 A1 | 11/2012 |
| EP | 2392622 B1 | 3/2013 |
| EP | 2840065 A1 | 2/2015 |
| JP | 2013500934 A | 1/2013 |
| JP | 2013538773 A | 10/2013 |
| NO | 2009017660 A2 | 2/2009 |
| WO | 2001077273 A1 | 10/2001 |
| WO | 2013142473 A1 | 9/2013 |
| WO | 2015004073 A1 | 1/2015 |

* cited by examiner

Figure 1 – viscosity-change of high solids suspension in relation to amount of MIPA Figure 2 – pH-change of high solids suspension in relation to amount of MIPA Figure 3 – conductivity-change of high solids suspension in relation to amount of MIPA

USE OF ADDITIVES CONTAINING PRIMARY ALKANOLAMINES IN AQUEOUS MINERAL SUSPENSIONS

The present invention relates to the technical domain of additives for aqueous high solids suspensions of mineral materials.

In the preparation of aqueous suspensions of mineral materials, the skilled person is often required to select and introduce additives in order to regulate one or more characteristics of this suspension. Among these characteristic is the wettability of the mineral particles, the pH of the suspension and the suspension conductivity. However, also the characteristics or properties of the additive itself may have a significant influence on its applicability and suitability for specific technical applications of the suspension containing such additive. Finally, the skilled person must bear in mind that the additive should remain cost efficient and should not lead to unwanted interactions or effects downstream during the transportation, processing and application of this suspension. The corresponding characteristics and requirements of such additives will be addressed in some more detail in the following.

A first consideration refers to the applicability of additives. It is generally desirable to apply additives in liquid form as this allows for better dosing and transporting. As the suspensions often are treated outdoors with the corresponding additives, the outdoor temperature may affect the applicability of the additive. More precisely, the addition of the additive to a suspension being contained e.g. in a tank wagon often has to be carried out at temperatures of below 10° C. This is especially true for Nordic countries, like Norway, with huge deposits of minerals. At such low temperatures, the additives may become solid or highly viscous and, thus, additional equipment and energy for warming the additives prior to its application to the suspensions may be required. Obviously, this represents a disadvantage.

Another difficulty, which is observed with respect to additives known in the art, is the low volatility. Mineral suspensions are often applied in paper coating applications (surface sizing), including single, double or triple paper and board surface coatings for packaging materials. Especially in the food sector, packing materials and its coatings, which may get into contact with the food, obviously should not contain any substances which may affect the quality or the aroma of the food. Therefore, it is desirable to remove any additives being introduced by the suspension partly or fully from e.g. coatings. For additives with low volatility (high boiling points), it is observed that even during the high temperature coating processes for applying coatings e.g. on papers or packing materials the unwanted additives fully or partly remain in the coating. The corresponding additive-containing coatings bear the inherent risk of contaminating the packaged food or affecting its quality, which, of course, is unwanted.

Another criteria for the selection of the additive refers to the required amount (mg/kg), which depends inter alia on the molecular weight of the additive. The amount usually should be as low as possible. It is especially considered to be less preferred to add components with a higher total organic carbon content. This content should be as low as possible for known environmental reasons, especially in aqueous systems.

Another consideration, which influences the selection of a suitable additive, is the variation (usually an increase) of the electrical conductivity of the mineral material-containing suspension, which may be caused by adding the additive.

A significant variation of the electrical conductivity of the mineral material-containing suspension is disadvantageous as aspects of the processing and transport of such a suspension are often regulated with the help of measurements of the suspension's electrical conductivity. For example, the flow rate of such a suspension through a given passage or unit may be controlled according to measurements made of the suspension conductivity. In the publication entitled "A Conductance Based Solids Concentration Sensor for Large Diameter Slurry Pipelines" by Klausner F et al. (J. Fluids Eng./Volume 122/Issue 4/Technical Papers), an instrument measuring the solids concentration of a slurry passing through pipelines of a given diameter based on conductance measurements is described. Based on these conductance measurements, it is possible to obtain a graphical display showing the variation of slurry concentration from the top to the bottom of the pipe, as well as the area-average concentration history. The degree of filling of a container can likewise be managed by detecting conductivity at a given height along a container wall. It is thus unwanted that the addition of an additive causes significant variations in the electrical conductivity values as this would distort the measuring results and, thus, the information obtained from said measurements.

Another important aspect relates to the wettability of the mineral material being contained in the suspension. Wetting the mineral particles is essential for them to be finely or homogeneously distributed in water. This is specifically true for high solids suspensions. Insufficient wetting leads to agglomeration of the particles and obviously affects the dispersion of the particles in the fluid. Wetting means that the air that surrounds the solid particles in an agglomerate must be removed or substituted by liquid. The processes involved in wetting a solid can be described by the Young equation:

wherein $\gamma_s$=free surface energy of the solid;

$\gamma_{sl}$=Interfacial energy solid/liquid;

$\gamma_l$=free energy associated with the air/liquid interface per unit surface area, commonly reported in units of mN/m, and referred to as "surface tension"; and θ=contact angle between the liquid and the solid.

It is evident and well-known that a liquid with a lower surface tension wets minerals better than one with higher surface tension. On the other hand, liquids with low surface tensions may have other disadvantages. It is generally known that some liquids, which reduce surface tension greatly, may produce and stabilize foams while others do not show such foaming properties. In the field of mineral suspensions, foaming is unwanted and should be avoided. The possible influence of additives being applied for e.g. increasing the pH of a suspension on the wetting or wettability of the mineral particles as well as the possible (unwanted) foaming properties so far has not received any attention in the art.

Among the functions of the additives used in mineral material suspensions, is the adjustment of the suspension pH. Suspension alkalinisation is notably required in order to match the pH of application environments into which the suspension is introduced, or in preparation for the addition of pH-sensitive additives. A step of raising the pH may also serve to disinfect or support the disinfection of a suspension. Adjustments to pH may be necessary to avoid the unwanted dissolution of mineral materials like calcium carbonate on contact with an acidic environment during processing. Such pH adjusting additives used in aqueous suspension of calcium carbonate-comprising material suspensions and available to the skilled person are numerous.

A first group of additives that may be used to raise the pH of an aqueous suspension of calcium carbonate-comprising materials are hydroxide-containing additives, and are especially alkali and earth alkali metal hydroxides.

For example, U.S. Pat. No. 6,991,705 refers to increasing the alkalinity of a pulp suspension, which may comprise calcium carbonate, by a combination of an alkali metal hydroxide feed, such as a sodium hydroxide feed, and a carbon dioxide feed.

Potassium hydroxide, magnesium hydroxide and ammonium hydroxide are other such additives used to control the pH of a PCC suspension in a range from 10 to 13, as referred to in EP 1 795 502. Exemplarily, also reference is also made to EP 2 392 622, example 1, test, where KOH is used to increase pH of a high solids $CaCO_3$ suspension.

A second group of additives that may be used to raise the pH of an aqueous suspension of calcium carbonate-comprising materials are additives that do not contain hydroxide ions, but which generate such ions on reaction with water. Such additives may be salts, such as sodium salts, of weak acids. Examples of this type of additive would include sodium acetate, sodium bicarbonate, potassium carbonate and alkaline phosphates (such as tripolyphosphates, sodium and/or potassium orthophosphates).

A further possibility is to employ nitrogen-based additives, including for example ammonia, amines and amides, in order to increase the pH of calcium carbonate-comprising material suspensions.

All of the above additives raise the pH of the aqueous suspension according to a common mechanism, which is by providing or creating, following reaction with water, hydroxide ions in the suspension.

From the literature, it is known that increasing the hydroxide ion concentration under alkaline condition leads in parallel to an increased conductivity ("Analytikum", $5^{th}$ Edition, 1981, VEB Deutscher Verlag für Grundstoffindustrie, Leipzig, page 185-186 referring to "Konduktometrische Titration").

It is documented in the literature that alkali and earth alkali hydroxides, as well as amines such as ethylamine cause a significant conductivity increase in parallel to raising the pH of an aqueous suspension of mineral materials. Such increase is unwanted for the reasons set out above. Other amines, such as triethanolamine, are just not strong enough bases to effectively increase the pH-value accordingly. Specific amines were suggested in the art as additives for solving the problem of significantly increasing the suspension conductivity upon addition of the additive to the suspension. Among these additives are 2-aminoethanol (MEA), 2-amino-2-ethyl-1,3-propanediol (AEPD), 2-amino-2-methyl-1-propanol (AMP) and 2-((1-methylpropyl)amino)ethanol, which are suggested as additives in aqueous suspensions in EP 2 392 622, EP 3 019 560, EP 2 281 853 and EP 2 354 191, respectively.

However, the foregoing additives partly have low volatility, are solid or too viscous at low temperatures, provide poor wettability and/or relatively high organic carbon contents. As a consequence, these additives, while solving the problem of unwanted increase in conductivity, do not provide the desired balance of low organic carbon content, high volatility, applicability at low temperatures and optimized wetting properties without unwanted foaming.

In view of the foregoing observations, it is an objective of the present invention to provide an additive, which provides a balance of the desired properties and needs described herein. These properties and needs include the additive's suitability for increasing the pH without significantly changing the suspension conductivity, the optimization of the wettability properties of the additive while avoiding unwanted foaming, the reduction of the organic carbon content of the additive, the provision of an additive which can be more easily removed during application of the suspension, especially for food packaging applications and/or the provision of an additive which allows for outdoor application of the additive also at low temperatures.

The foregoing and other objectives are solved by the subject-matter as defined herein and especially in the claims of the present application.

A first aspect of the present invention resides in the use of an additive comprising a primary alkanolamine in an aqueous suspension containing 48 to 84 wt.-%, based on the total weight of the suspension, of at least one mineral material for increasing the suspension pH by at least 0.3 pH units and/or for increasing the wettability of the at least one mineral material in the suspension, wherein the at least one mineral material has a density of 2.0 to 3.0 $g/cm^3$;

wherein the primary alkanolamine has at most 4 carbon atoms, has a surface tension of 30 to 40 mN/m at 23° C., has a melting point of less than 5° C. and a boiling point of less than 163° C.;

wherein the suspension contains at least one polycarboxylate dispersant in an amount of 0.1 to 1.5 wt.-%, based on the dry mineral material, wherein the primary alkanolamine is added in an amount of from 200 to 10 000 mg, per kg of the aqueous phase of said suspension, yielding a suspension pH of 8.0 to 11.5.

The inventors of the present patent application surprisingly found that it is possible to select or provide additives for aqueous mineral suspensions, which are not only suitable for increasing the pH value to the desired range of 8.0 to 11.5, but also provide further desired or advantageous properties. More precisely, it was found that specific primary alkanol amines can be used for effectively adjusting the pH value of a mineral suspension containing at least one mineral material with a density of 2.0 to 3.0 $g/cm^3$ (like calcium carbonate, kaolin, clay, mica or talc), while at the same time a significant or unwanted increase in suspension conductivity is avoided. The present invention relates to so-called high solid suspension. The inventive high solids suspensions contain at least one polycarboxylate dispersant. Furthermore, the inventive additive comprising said specific primary alkanolamine allows for easier removal from e.g. coating compositions during drying, which in turn allows for the application of the inventive suspension e.g. or in food packaging applications. Alternatively or additionally, it offers the possibility to coat at higher machine speed, which results cost savings. Another important effect provided by the inventive additive relates to the wetting of the mineral particle surface being contained in the suspension. The wettability of the mineral particle surfaces or the mineral material is significantly increased by the use of the inventive additive. Finally, the foaming tendency of the inventive suspensions is very low, which provides another technical advantage.

According to the present invention, the additives must comprise a primary alkanolamine fulfilling specific physicochemical properties. More precisely, the primary alkanolamine must have at most 4 carbon atoms, a surface tension of 30 to 40 mN/m at 23° C., a melting point of less than 5° C. and a boiling point of less than 163° C., preferably 160° C. or below. The selection of a primary alkanolamine with the aforementioned properties, surprisingly allows for the provision of an additive, which provides a balance of the desired properties and needs described above. These needs include—beside the pH value increase and the increased wettability—a low organic carbon content, the processability of the additive also at very low temperatures, the easier removal of the additive from the suspension during or after application, the avoidance or reduction of the unwanted formation of foam and, finally, a stable suspension conductivity.

A second aspect of the present invention relates to a method for increasing the pH of an aqueous suspension containing 48 to 84 wt.-%, based on the total weight of the suspension, of at least one mineral material, wherein the method involves the step of adding a liquid additive comprising a primary alkanolamine to the suspension in an amount of from 200 to 10 000 mg, per kg of the aqueous phase of said suspension, so that the pH of the suspension is increased by at least 0.3 pH units yielding a suspension pH of 8.0 to 11.5, wherein the at least one mineral material has a density of 2.0 to 3.0 g/cm$^3$ and wherein the primary alkanolamine has at most 4 carbon atoms, has a surface tension of 30 to 40 mN/m at 23° C., has a melting point of less than 5° C. and a boiling point of less than 163° C. and wherein the suspension contains at least one polycarboxylate dispersant in an amount of 0.1 to 1.5 wt.-%, based on the dry mineral material.

A third aspect of the present invention relates to a method for increasing the wettability of at least one mineral material in an aqueous suspension containing 48 to 84 wt.-%, based on the total weight of the suspension, of the at least one mineral material, wherein the method involves the step of adding a liquid additive comprising a primary alkanolamine to the suspension in an amount of from 200 to 10 000 mg, per kg of the aqueous phase of said suspension, wherein the at least one mineral material has a density of 2.0 to 3.0 g/cm$^3$ and wherein the primary alkanolamine has at most 4 carbon atoms, has a surface tension of 30 to 40 mN/m at 23° C., has a melting point of less than 5° C. and a boiling point of less than 163° C. and wherein the suspension contains at least one polycarboxylate dispersant in an amount of 0.1 to 1.5 wt.-%, based on the dry mineral material.

A fourth aspect relates to an aqueous suspension which is obtainable by the inventive methods and use described herein. A fifth aspect relates to an aqueous suspension which is directly obtained by the inventive methods described herein.

When in the following reference is made to preferred or optional features and embodiments of the present invention, it is to be understood that these preferred embodiments or optional features relate to all aspects of the present invention.

According to an especially preferred embodiment, the primary alkanolamine is 1-amino-2-propanol, which is also called Monoisopropanolamine (MIPA). 1-amino-2-propanol has the CAS Number 78-96-6.

The at least one mineral material according a preferred embodiment of the invention is selected from the group consisting of calcium carbonate, kaolin, clay, mica and talc and preferably is selected from natural calcium carbonate, synthetic calcium carbonate and mixtures of natural calcium carbonate and synthetic calcium carbonate. The natural calcium carbonate may be designated GCC, while the synthetic calcium carbonate also is called PCC.

It was found by the inventors of the present application, that the inventive additive allows for the desired pH value adjustment (increase), but avoids a significant and unwanted increase in suspension conductivity. It is especially preferred that the suspension conductivity change caused by the addition of the additive is less than 100 µS/cm/pH unit, preferably less than 70 µS/cm/pH unit and more preferably less than 50 µS/cm/pH unit. The inventive suspension may have a conductivity of between 100 and 30000/cm, and preferably of between 200 and 1400 µS/cm, prior to the addition of the additive.

In order to provide good processability (transporting, applications), the inventive suspension after treatment with the additive preferably provides a suspension viscosity in the range of 50 to 1500 mPas at 25° C.

The primary alkanolamine is preferably added to said suspension in an amount to increase the pH of the suspension by at least 0.4 pH units and preferably by at least 0.7 pH units.

The additive preferably consists of 1-amino-2-propanol and water, wherein the additive preferably contains at least 90 wt.-%, based on the weight of the additive, more preferably at least 95 wt.-% and most preferably at least 99 wt.-% of 1-amino-2-propanol. According to another embodiment the additive is 1-amino-2-propanol.

The high solids suspension according to the present invention according to a preferred embodiment contains 50 to 82 wt.-%, based on the total weight of the suspension, of at least one mineral material, preferably 65 to 80 wt.-%. The amount of mineral material preferably represents the total solids content in the suspension.

According to the present invention the additive may be added prior to, during or after, and preferably after, a step of grinding said at least one mineral material. It is preferred that the additive is added in liquid from to the suspension.

The improved wettability of the mineral material may be reflected by a low surface tension of the aqueous phase of the suspension. In other words, the surface tension of the aqueous phase is lower than without additive. According a preferred embodiment of the invention, the aqueous phase of the suspension has a surface tension of 55 to 65 mN/m at 23° C. and preferably has a surface tension of 55 to 60 mN/m at 23° C.

The suspension obtained by the present invention may preferably be used for or added to paint compositions, paper coating compositions or as paper filler compositions.

The following terms used throughout this document shall have the meanings as set forth hereinafter.

A "suspension" or "slurry", "slurries" in the meaning of the present invention refers to a mixture comprising at least one insoluble solid in a liquid medium, for example water, and optionally further additives, and usually contains large amounts of solids and, thus, is more viscous (higher viscosity) and can have a higher density than the liquid medium from which it is formed.

The term "mineral material" in the meaning of the present invention refers to naturally occurring or synthetically produced substances that are solid under standard ambient temperature and pressure (SATP), i.e. at a temperature of 25° C. and an absolute pressure of 100 kPa. The naturally occurring substances are inorganic and have a crystal structure or are amorphous. The mineral material includes "coating minerals" and "filler minerals".

The term "ground natural calcium carbonate" (GNCC) in the meaning of the present document refers to a particulate material obtained from natural calcium carbonate-containing minerals (e.g. chalk, limestone, marble or dolomite), which has been processed in a wet and/or dry comminution step, such as crushing and/or grinding, and optionally has been subjected to further steps such as screening and/or fractionation, for example, by a cyclone or a classifier.

A "precipitated calcium carbonate" (PCC) is a synthesized material, obtained by precipitation following a reaction of carbon dioxide and calcium hydroxide (hydrated lime) in an aqueous environment. Alternatively, precipitated calcium carbonate can also be obtained by reacting calcium- and carbonate salts, for example calcium chloride and sodium carbonate, in an aqueous environment. PCC may have a vateritic, calcitic or aragonitic crystalline form. PCCs are described, for example, in EP 2 447 213 A1, EP 2 524 898 A1, EP 2 371 766 A1, EP 2 840 065 A1, or WO 2013/142473 A1.

For the purpose of the present invention, pH shall be measured according to the measurement method defined in the examples section herein below.

The term "conductivity" or "suspension conductivity" according to the present invention shall mean the electrical conductivity of the aqueous suspension as measured according to the measurement method defined in the examples section herein below.

The "suspension viscosity" according to the present invention is determined according to the measurement method defined in the examples section herein below.

The term "total solids content" and "total dry weight" referred to herein may be used interchangeably. The total solids content or total dry weight can be determined as set out in the experimental section herein below. These terms are meant to include any residual components obtained under the conditions of the corresponding measuring method, e.g. binder, metal complex, pigments, additives etc. The skilled person will recognize that the balance is a liquid medium, typically water. The total solids content of a suspension (also known as "dry weight") is determined as defined in the examples section herein below.

The term "solid" according to the present invention refers to a material that is solid under standard ambient temperature and pressure (SATP) which refers to a temperature of 298.15 K (25° C.) and an absolute pressure of exactly 100 kPa. The solid may be in the form of a powder, tablet, granules, flakes etc. Accordingly, the term "liquid medium" or "liquid" refers to a material that is liquid under standard ambient temperature and pressure (SATP) which refers to a temperature of 298.15 K (25° C.) and an absolute pressure of exactly 100 kPa.

The "melting point" (m.p.) and the "boiling point" (b.p.) of the primary alkanolamine according to the present invention refer to the primary alkanolamine itself (neat alkanolamine). The values given herein for the "melting point" and the "boiling point" are the values obtained or measured at standard ambient temperature and pressure (SATP) corresponding to a temperature of 298.15 K (25° C.) and an absolute pressure of 100 kPa.

The "surface tension" of the primary alkanolamine according to the present invention refers to the primary alkanolamine itself (neat alkanolamine), i.e. to the primary alkanolamine with at least 99 wt.-% purity (less than 1 wt.-% moisture), and is measured at 23° C. as described in the experimental section below.

An "increased wettability" of the mineral material according to the present invention is reflected by a lowering of the surface tension of the aqueous phase of the mineral material suspension. The surface tension is measured as described in the experimental section below.

A "dry" material (e.g., dry calcium carbonate) may be defined by its total moisture content which, unless specified otherwise, is less than or equal to 1.0 wt.-%, more preferably less than or equal to 0.5 wt.-%, even more preferably less than or equal to 0.2 wt.-%, and most preferably between 0.03 and 0.07 wt.-%, based on the total weight of the dried material.

Unless specified otherwise the term "Weight molecular weight Mw" means the average by weight of molecular weights determined using the size exclusion chromatography (SEC) method described in the experimental section.

Unless specified otherwise the term "Polydispersity index Ip" means the weight average molecular weight Mw divided by the number average molecular weight Mn, so that it corresponds to the molecular weight distribution of the different macromolecules within the polymer.

Unless specified otherwise, the term "drying" refers to a process according to which water is removed from a material to be dried such that a constant weight of the obtained "dried" material at 120° C. is reached, wherein the mass (sample size 5 g) does not change more than 1 mg over a period of 30 s.

The "particle size" of particulate mineral materials herein is described by its distribution of particle sizes $d_x(wt)$. Therein, the value $d_x(wt)$ represents the diameter relative to which x % by weight of the particles have diameters less than $d_x(wt)$. This means that, for example, the $d_{20}$ (wt) value is the particle size at which 20 wt. % of all particles are smaller than that particle size. The $d_{50}$ (wt) value is thus the weight median particle size, i.e. 50 wt. % of all particles are smaller than that particle size and the $d_{98}$ (wt) value, referred to as weight-based top cut, is the particle size at which 98 wt. % of all particles are smaller than that particle size. The weight-based median particle size $d_{50}$ (wt) and top cut $d_{98}$ (wt) are measured by the sedimentation method, which is an analysis of sedimentation behaviour in a gravimetric field. The measurement is made with a Sedigraph™ 5100 of Micromeritics Instrument Corporation, USA. The method and the instrument are known to the skilled person and are commonly used to determine particle size distributions. The measurement is carried out in an aqueous solution of 0.1 wt.-% $Na_4P_2O_7$. The samples are dispersed using a high speed stirrer and sonication.

Throughout the present document, the term "specific surface area" (in $m^2/g$) refers to the specific surface area as determined by using the BET method (using nitrogen as adsorbing gas).

Where an indefinite or definite article is used when referring to a singular noun, e.g. "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

The present invention relates to the use of specific additives for mineral material containing suspensions. More precisely, the present invention is concerned with additives for increasing the pH value of high solids suspensions and/or for increasing the wettability of mineral materials in the suspension. High solids suspension being made from mineral materials like calcium carbonate, talc, kaolin, clay or mica usually comprise a dispersant in order to obtain a stable suspension which e.g. can be pumped and transported. According to the present invention, the dispersant is a partially or totally neutralized polycarboxylate dispersant being preferably neutralized with mono-, di- and/or trivalent cations, preferably inorganic cations. Suitable polycarboxylates include homo- and copolymers of acrylic acid, methacrylic acid and/or maleic acid as well as natural polymers, such as carboxymethylcellulose (CMC). According to a preferred embodiment of the present invention, the polycarboxylate dispersant is a salt of a homo- or copolymer of partially or fully neutralized polyacrylic acid or a blend thereof, wherein the neutralisation agent preferably is inorganic.

The polycarboxylate dispersant according to the present invention is added in an amount of 0.1 to 1.5 wt.-%, based on the dry mineral material, more preferably in an amount of 0.5 to 1.2 wt.-%. The amount of polycarboxylate dispersant preferably is adjusted such that the polycarboxylate dispersant in the end product (after grinding) is contained in an amount of 0.1 to 2 mg/m$^2$ of the mineral material, more preferably in an amount of 0.5 to 1.5 mg/m$^2$ of the mineral material. Thus, according to a preferred embodiment, the polycarboxylate dispersant is added in an amount of 0.1 to 1.5 wt.-%, based on the dry mineral material, more preferably in an amount of 0.5 to 1.2 wt.-%, so that the polycarboxylate dispersant in the end product is contained in an amount of 0.1 to 2 mg/m$^2$ of the mineral material, more preferably in an amount of 0.5 to 1.5 mg/m$^2$ of the mineral material. The inventors of the present invention found that the inventive additive allows for achieving a balance of several different technically advantageous properties in high solids mineral material suspension containing a polycarboxylate dispersant.

The primary alkanolamine according to the present invention preferably has a chemical purity of more than 97 wt.-%, preferably more than 98 wt.-%, more preferably more than 99 wt.-% in respect to the primary alkanolamine.

The mineral material being contained in the suspension according to the present invention comprises at least one mineral material having a density of 2.0 to 3.0 g/cm$^3$, like calcium carbonate, talc, kaolin, clay or mica. Calcium carbonate (PCC and/or GCC and/or MCC) and kaolin are especially preferred mineral materials. The density is the density of the mineral material itself (i.e. not the bulk density or powder density).

The solids content of the corresponding mineral material suspension can be adjusted by known means. The high solids suspension according to the present invention contains 48 to 84 wt.-%, based on the total weight of the suspension, of at least one mineral material, preferably contains 50 to 82 wt.-%, based on the total weight of the suspension, of at least one mineral material, and more preferably 65 to 80 wt.-%. The corresponding aqueous suspension containing the mineral material in particulate form and the inventive dispersant, according to the present invention is treated with a specific additive. Said additive according to the present invention is used for increasing the suspension pH by at least 0.3 pH units and/or for increasing the wettability of the at least one mineral material in the suspension. The inventive additive is added in an amount of from 200 to 10 000 mg, per kg of the aqueous phase of said suspension, so that a suspension pH of 8.0 to 11.5 is achieved. The additive is preferably added to said suspension in an amount to increase the pH of the suspension by at least 0.4 pH units and preferably by at least 0.7 pH units or even by more than 1 pH unit.

One very important advantage of the use of the inventive additive resides in the finding that the addition of the additive does not lead to significant or unwanted increase in conductivity. More precisely, it has been found by the inventors of the present application that the inventive additive avoids a significant and unwanted increase in suspension conductivity. The suspension conductivity change caused by the addition of the additive according to the present invention is less than 100 µS/cm/pH unit, preferably less than 70 µS/cm/pH unit and more preferably less than 500/cm/pH unit. The inventive suspension may have a conductivity of between 100 and 3000 µS/cm, and preferably of between 200 and 1400 µS/cm, prior to the addition of the additive.

Following addition of alkanolamine to said suspension, the suspension may be introduced in a unit equipped with a conductivity-based regulation device. For example, the suspension may be introduced in a container or unit up to a level determined by measurement of the suspension conductivity. The suspension may additionally or alternatively be passed through a passage having a suspension throughput regulated as a function of the suspension conductivity. In this respect, "passage" can relate to a confined region of throughput, as well as a throughput without any definition of confinement, i.e. after one passage of the process.

The inventive suspension after treatment with the additive preferably provides a suspension viscosity in the range of 50 to 1500 mPas at 25° C. in order to ensure good processability. The viscosity should allow for the desired transporting steps (pumping) and for the desired application of the suspension at the manufacturing sites.

One very important aspect of the present invention relates to the selection of the additive. The inventors of the present application surprisingly found that by selecting an additive providing specific properties, it is possible to address several needs or desires at the same time. Beside the aforementioned increase of the pH value (while maintaining the conductivity), it is also possible to achieve an improved wettability of the mineral material being contained in the suspension. Advantageously, no foaming problems are observed although the wettability is significantly improved by lowering the surface tension of the aqueous phase of the suspension. Additionally, the additive can be introduced also under outdoor conditions and especially at cold temperatures. Especially in Northern countries like Norway, the treatment of the suspension with additives is carried out outside, e.g.

when loading train wagons. Additives which are solid at temperatures around 5 to 10° C. or even up to 30° C. obviously have to be pretreated or warmed in order to be dosed in liquid form to the suspension. Another selection criterion for the additive according to the present invention relates to the final application of the inventive suspension. More precisely, mineral material containing suspensions very often are applied in paper applications and especially in paper coating applications. In this context, it is important to note that the suspension together with other compounds is applied as a coating composition on e.g. paperboard or papers, usually in liquid form, and is then dried. The application of the coating composition and the drying very often is done shortly one after the other, i.e. at essentially the same time. Obviously, during the coating process the aqueous phase has to be removed. It is generally desirable to also remove the additives, which are not needed for the properties of the coating resulting from said process. This is especially true for food packaging applications where it has to be ensured that additives, which may cause quality issues by migration into the food or by odor are removed as far as possible. Therefore, one selection criterion of the additive contemplated according to the present invention relates to the volatility, i.e. to the ability of the additive to be removed e.g. during coating processes.

The inventors of the present application provided several specific selection criteria, which finally ensure that the balance of the aforementioned desired properties and needs is achieved. The first selection criterion refers to the chemical nature of the additive. According to the present invention, the additive must comprise a primary alkanolamine. Said alkanolamine must fulfill several specific physicochemical parameters: it must have a melting point of less than 5° C. and a boiling point of less than 163° C., preferably of 160° or below. Furthermore, it must have a surface tension of 30 to 40 mN/m at 23° C. in order to ensure the desired applicability over a wide temperature range including cold temperatures and the desired volatility, while providing increased wettability of the mineral material being contained in the suspension. Another requirement refers to the amount of organic carbon, which is introduced into the suspension by adding the additive. Obviously, the corresponding amount should be as low as possible. Therefore, only primary alkanolamines with at most 4 carbon atoms are applied according to the present invention.

According to the concept underlying the present invention, the additive is specifically used for increasing the pH value as defined herein. Additionally or alternatively, the additive may specifically be used for increasing the wettability of the mineral material in the suspension. The resulting suspension containing the inventive dispersant and the inventive additive preferably provides a conductivity in the range of 100 and 3000 μS/cm, preferably of between 200 and 1400 μS/cm, and suspension viscosity in the range of 50 to 1500 mPas at 25° C.

According to an especially preferred embodiment of the present invention, the primary alkanolamine is 1-amino-2-propanol, which is also called Monoisopropanolamine (MIPA). 1-amino-2-propanol has the CAS Number 78-96-6. The additive preferably consists of 1-amino-2-propanol and moisture, wherein the additive preferably contains at least 95 wt.-%, based on the weight of the additive, more preferably at least 99 wt.-% of 1-amino-2-propanol. The inventors found that 1-amino-2-propanol surprisingly provides the desired balance of important properties as set out and explained above. Without wishing to be bound to any theory, it appears that the inventive combination with the dispersant e.g. supports the "non-foaming" properties of the resulting suspension.

Following addition of alkanolamine to said suspension, the suspension may be introduced into a unit equipped with a conductivity-based regulation device. For example, the suspension may be introduced in a container or unit up to a level determined by measurement of the suspension conductivity. The suspension may additionally or alternatively be passed through a passage having a suspension throughput regulated as a function of the suspension conductivity. In this respect, "passage" can relate to a confined region of throughput, as well as a throughput without any definition of confinement, i.e. after one passage of the process.

In cold seasons, for example in Norway's winter time it is of importance that the additive is still liquid below 5° C., for example at around 0° C., as additives are usually dosed by pumps, for example peristaltic pumps, and transported or delivered through long pipes. A solidification due to cold temperature would lead to wrong dosages or even to a damaging of the dosing system itself. Due to this fact the pumps and pipes have to be insulated and depending on the selection of the additive—heated. The energy consumption required to heat the pipes or the transporting/dosing system to above 10° C., or even higher, is very costly. The same is true for the road or rail transport of such additives. Solidification of additives in railcars, road and/or ship tankers has to be avoided for obvious reasons.

Paper coating may be employed. In a typical process, the moist paper sheet passes between infrared dryers before being conveyed to high-temperature air floats and/or drying cylinders. A low boiling point of no more than 160° C. allows for a more efficient removal of the no more needed additives from the paper surface, especially if the additive does not form an a zeotropic system with water.

In principle, coating includes the phases of application of the coating composition onto the base paper, metering of the coating, drying of the coating and possibly smoothing of the surface, e. g. by calendering.

Pre-metering, or metering before application takes place, e. g., in the metered size press (MSP) and in the gate roll press. Simultaneous metering or metering and application take place at the same time in the short dwell time applicator (SDTA) and in the conventional size press. Post-metering, or metering after application takes place in the blade coater, in the rod coater, and in the air knife coater. Coating can be done double-sided, i.e., both sides of the paper are coated simultaneously or on only one side at a time. Printing papers are usually coated similarly on both sides, and boards often on one side only. Single coating means that only one coating layer is applied per paper side, in multiple coating several coating layers are applied per paper side. The most common multiple coating is double coating. If coating is done on-machine, then the coating usually will immediately follow the manufacturing of the base paper. During coating liquid is removed from the coating composition, which then adheres to the base paper. Decreasing the surface tension of the liquid phase of the coating colour supports the wettability. In other words, the decrease of the surface tension of the water phase improves the wetting of, for example, the mineral material, but also of the base paper fibres and, thus, supports the-evenness of the coating on the base paper, especially in wood containing base paper (for example hydrophobic lignin containing wood particles) and so supports glossiness and printability of the coating.

According to the fourth and fifth aspect of the present invention, an aqueous suspension is provided, wherein said suspension is obtainable or directly obtained by the inventive methods. The aqueous phase of the aqueous suspension obtainable or directly obtained by the inventive methods preferably has a surface tension of 53 to 65 mN/m at 23° C. and/or the solids in the mineral suspension have an anionic charge density. The charge of the solids in the mineral material suspension obtainable or directly obtained by the inventive methods preferably is −20 to −200 µVal/g.

An inventive aqueous suspension, thus, may comprise 48 to 84 wt.-%, based on the total weight of the suspension, of at least one mineral material, wherein the mineral material has a density of 2.0 to 3.0 g/cm$^3$,
a primary alkanolamine in an amount of from 200 to 10 000 mg, per kg of the aqueous phase of said suspension, wherein the primary alkanolamine has at most 4 carbon atoms, has a surface tension of 30 to 40 mN/m at 23° C., has a melting point of less than 5° C. and a boiling point of less than 163° C., and
at least one polycarboxylate dispersant in an amount of 0.1 to 1.5 wt.-%, based on the dry mineral material,
wherein the aqueous suspension has a pH of 8.0 to 11.5,
wherein the aqueous phase of the aqueous suspension has a surface tension of 53 to 65 mN/m at 23° C., and
wherein the solids in the mineral suspension have an anionic charge density being in the range of −20 to −200 µVal/g.

It is to be understood that the preferred embodiments or optional features described with respect to the inventive use and the inventive methods herein also relate to the inventive aqueous suspension. Therefore, it is for example preferred that the mineral material is selected from the group consisting of calcium carbonate, kaolin, clay, mica and talc and preferably is selected from natural calcium carbonate (GCC), synthetic calcium carbonate (PCC) and mixtures of natural calcium carbonate and synthetic calcium carbonate. Furthermore, it is e.g. preferred that the primary alkanolamine is 1-amino-2-propanol. The inventive suspension obtainable or directly obtained by the inventive methods preferably has a conductivity of between 100 and 3000 µS/cm, and preferably of between 200 and 1400 µS/cm, after the addition of the primary alkanole amine. Further, it is preferred that the inventive suspension has a suspension viscosity after addition of the additive in the range of 50 to 1500 mPas at 25° C.

EXAMPLES

The scope and interest of the invention may be better understood on basis of the following examples which are intended to illustrate embodiments of the present invention.

The following measurement methods were used for the provision of the following data and are contemplated to be used according to the present invention:

pH Measurement

Any pH value is measured at 25° C. using a Mettler-Toledo Seven Easy pH meter and a Mettler-Toledo InLab Expert Pro pH electrode. A three point calibration (according to the segment method) of the instrument is first made using commercially available buffer solutions having pH values of 4, 7 and 10 at 25° C. (from Aldrich). The reported pH values are the endpoint values detected by the instrument (signal differs by less than 0.1 mV from the average over the last 6 seconds).

Conductivity Measurement

Conductivity of a suspension is measured at 25° C. using Mettler Toledo Seven Multi instrumentation equipped with the corresponding Mettler Toledo conductivity expansion unit and a Mettler Toledo InLab 731 conductivity probe, directly following stirring the suspension at 1500 rpm using a Pendraulik tooth disc stirrer. The instrument is first calibrated in the relevant conductivity range using commercially available conductivity calibration solutions from Mettler Toledo. The influence of temperature on conductivity is automatically corrected by the linear correction mode. Measured conductivities are reported for the reference temperature of 20° C. The reported conductivity values are the endpoint values detected by the instrument (the endpoint is when the measured conductivity differs by less than 0.4% from the average over the last 6 seconds).

Particle size distribution (mass % particles with a diameter<X) and weight median grain diameter ($d_{50}$) of particulate material are determined via the sedimentation method, i.e. an analysis of sedimentation behavior in a gravimetric field. The measurement is made with a Sedigraph™ 5100 at 25° C. The method and the instrument are known to the skilled person and are commonly used to determine grain size of fillers and minerals. The measurement is carried out in an aqueous solution of 0.1% by weight of $Na_4P_2O_7$. The samples were dispersed using a high speed stirrer and ultrasonic.

Viscosity Measurement

Brookfield viscosity is measured after 1 minute (if no other indication) of stirring by the use of a RVT model Brookfield™ viscometer at room temperature and a rotation speed of 100 rpm (revolutions per minute) with the appropriate disc spindle 2, 3 or 4 at 25° C.

Weight Solids (% by Weight) of a Material in Suspension

Weight solids is determined by dividing the weight of the solid material by the total weight of the aqueous suspension. The weight of the solid material is determined by weighing the solid material obtained by evaporating the aqueous phase of suspension and drying the obtained material to a constant weight. The additive is added an amount being defined by mg per kg of aqueous phase of the suspension. In order to evaluate the amount of additive per kg of the aqueous phase of a suspension, the weight in kg of the aqueous phase is first determined by subtracting the weight of the solid from the total weight of the suspension.

Density of Liquid Additive

The densities as indicated herein were determined by use of a pycnometer. A pycnometer is a glass flask of a known weight. To determine its exact volume it is filled with a calibration liquid (in the present case water) of a known density. By weighing the contained water, one can calculate the exact volume with the known density of water. In a third step, a simple calculation provides information about the exact volume (volume=weight/density). When determining the unknown density of the additive afterwards, the same formula is just used in a different way (density=weight/volume).

Densities at 5° C. were determined by first conditioning the additive and pycnometer at 3 to 5° C. for 24 hours in a refrigerator.

Foaming of Aqueous Phase of Suspension

The foaming tendency was measured by adding 10 ml of the aqueous phase of the suspension in a 15 ml (1 to 1 ml calibrated) polystyrene tube, closing it with a PE cap and shaking it strongly (by hand) for 30 sec. The height of foam after 10 sec. after 1 min and after 10 min can be read from the scaling of the tube.

Surface Tension

The surface tension was measured in triplicate at 23° C. (+1° C.) on a Kruss "Force Tensiometer-K100" (Serial Nr. 30001438) with the plate method (Wilhelmy-Method) (Plate PLOT/38371). The surface tension of the primary alkanolamine was measured at a concentration of at least 99 wt.-% (less than 1 wt.-% moisture).

Specific Surface Area

The specific surface area (in m²/g) is determined using the BET method (using nitrogen as adsorbing gas), which is well known to the skilled man (ISO 9277:2010). The total surface area (in m²) of the mineral material is then obtained by multiplication of the specific surface area and the mass (in g) of the corresponding sample.

The "Weight molecular weight Mw" means the average by weight of molecular weights determined using the size exclusion chromatography (SEC) method described below:

A test portion of the polymer solution corresponding to 90 mg of dry matter is introduced into a 10 ml flask. Mobile phase, with an additional 0.04 wt.-% of dimethylformamide, is added, until a total mass of 10 g is reached. The composition of this mobile phase at pH 9 is as follows: $NaHCO_3$: 0.05 mol/l, $NaNO_3$: 0.1 mol/l, triethanolamine: 0.02 mol/l, 0.03 wt.-% of $NaN_3$.

The SEC equipment is consisting of an isocratic pump of the Waters™ 515 type, the flow rate of which is set at 0.8 ml/min., a Waters™ 717+ sample changer, a kiln containing a precolumn of the "Guard Column Ultrahydrogel Waters™" type, which is 6 cm in length and has an internal diameter of 40 mm, followed by a linear column of the "Ultrahydrogel Waters™" type which is 30 cm in length and has an internal diameter of 7.8 mm. Detection is accomplished by means of a Waters™ 410 type differential refractometer. The kiln is heated to a temperature of 60° C. and the refractometer is heated to a temperature of 45° C. The SEC is calibrated with a series of sodium polyacrylate standards supplied by Polymer Standard Service having maximum molecular weight of between 2000 and $1*10^6$ g/mol and a polydispersity index of between 1.4 and 1.7 and also with a sodium polyacrylate of average weight molecular weight of 5600 g/mol and polydispersity index equal to 2.4.

The calibration graph is of the linear type and takes account of the correction obtained using the flow rate marker (dimethylformamide).

Acquisition and processing of the chromatogram are accomplished through use of the PSS WinGPC Scientific v. 4.02 application. The chromatogram obtained is incorporated in the area corresponding to molecular weights higher than 65 g/mol.

Charge Measurement of the Suspension

Principle:

A sample of the suspension is treated under strong agitation with an excess of cationic polymer (poly-DADMAC) using automatic titrator (Mettler T.X serie, for example T7), is filtered, is buffered at pH 4.65 (Acetate/Acetic acid) and the excess of poly-DADMAC is then back titrated using an anionic polymer (KPVS). The endpoint is detected by an optical electrode, which measures/detects the turbidity/cloudiness of the poly-DADMAC/KPVS precipitate.

Reagents:

0.01 M aqueous solution of poly Di-allyl-dimethyl-ammonium chloride (poly-DADMAC), medium molecular weight 200,000-350,000, (Sigma-Aldrich Art. 409022-1L);

0.01 M aqueous solution of potassium polyvinylsulfat (KPVS), (SERVA Feinbiochemica Heidelberg.

Pre-Titration of the Samples with Poly-DADMAC (Slow Dosing of 10 mL)

1.0 g of suspension sample are weighed in and suspended into an end volume of approx. 30 mL with demineralized water. 10 ml of 0.01 M aqueous poly-DADMAC solution is dosed. To ensure that the reaction of the cationic groups of the poly-DADMAC with the anionic dispersant of the sample as complete as possible, it is dosed quite slowly (0.1 mL per 10 s) under stirring. The whole pre-titration thus takes about 17 min.

Filtration of the Pre-Titrated Samples

Prior to the filtration the poly-DADMAC has to react as complete as possible and the solids content should sediment sufficiently, so that filtration is possible. This takes about 30-60 min before the filtration is made. The filtration is made over 0.8 µm membrane filters. If the filtrate is turbid, 0.45 µm or 0.2 µm membrane filters have to be used.

(Back-)Titration of the Samples

To obtain reproducible values, approx. 5 mL titration solution should be consumed during the back titration. If the consumption is <2 mL or >8 mL, the determination has to be repeated with corrected weight-in quantity. The clear filtrated samples having a pH value of approx. 8 are adjusted to a pH value of 4.65 using 0.1 molar acidic acid/acetate buffer. With a titrator the amount of excess poly-DADMAC is determined using 0.01 M of the reagent KPVS and the Phototrode DP5 from Mettler to detect the equivalence point. The Phototrode is adjusted to approx. 1200-1800 mV using clear water. A factor of the poly-DADMAC solution versus KPVS (KPVS f=1.00) is determined Calculation $$Q_{atro} = \frac{((V_{PDADMAC} * t_{PDADMAC}) - V_{KPVS}) * (-1000)}{m_{sample} * FS} [\mu Val/g]$$

wherein:

m sample=Weight-in quantity of sample [g]

FS=solids content [%]

$V_{PDADMAC}$=Volume poly-DADMAC [ml]

$V_{KPVS}$=Volume KPVS [mL]

$t_{PDADMAC}$=Titer poly-DADMAC (Factor against KPVS)

$Q_{atro}$=Charge [µVal/g] of the solids in the mineral material suspension

Melting point (m.p.)/boiling point (b.p.)

The melting points and boiling points are determined in accordance with "Basics: Laborpraxis, Band 2: Messmethoden, Kapitel 6.1.1 ff and 8.2.2 ff; 6. Auflage, Springer Verlag 2017". The equipment which was used is Büchi Melting point B-540 for melting and boiling points.

In the following the tests are described:

The additives which were used and compared are listed below. It is indicated which additives are inventive and which additives represent comparative examples. The melting points (m.p.) and boiling points (b.p.) were taken out of the literature (Rompps Chemie-Lexikon, 8. Ausgabe, 1979 and CRC Handbook of Chemistry and Physics, 82nd edition, 2001-2002 or were measured with the method described above. It is indicated for each additive where the data are derived from ("Rompp" or "measured").

Surface tension of MEA was taken out of CRC Handbook of Chemistry and Physics, 82nd edition, 2001-2002. Surface tension of MIPA and AMP were measured with the method described above.

Comparative:

2-aminoethanol—MEA, CAS 141-43-5 (<1 wt.-% moisture) m.p. 10° C., (Römpp) b.p. 171° C. (Römpp)

Surface tension: 48.3 mN/m; CRC Handbook of Chemistry and Physics, 82nd edition, 2001-2002

Comparative:

2-amino-2-methyl-1-propanol—AMP, CAS 124-68-5 (<1 wt.-% moisture)

m.p. 29-30° C. (measured)

b.p. 167° C. (measured)

Surface tension: solid at 23° C. (cannot be measured) measured at 40° C.: <30 mN/m (30.0/29.4/29.7)

Inventive:

1-amino-2-propanol—MIPA, CAS 78-96-6 (<1 wt.-% moisture)

m.p. 1° C., (Römpp)

b.p. 158-159° C. (measured)

Surface tension: 36 mN/m (36.5/36.4/36.4) at 23° C.

Example 1

This example relates to the measurement of the density and viscosity of the respective additives at a temperature of +5° C. (simulating cold outdoor conditions) using a Pycnometer.

Density of the additive at +5° C.

MEA: solid

AMP: solid

MIPA: the density at +5° C. is 0.957 g/ml

Brookfield viscosity of the additive at +5° C.

MEA: solid, not possible to measure at +5° C./Brookfield visc.>>1000 mPas

AMP: solid, not possible to measure at +5° C./Brookfield visc.>>1000 mPas

MIPA: Brookfield visc.<500 mPas at +5° C., easy to pump

Example 2

This example implements a natural calcium carbonate of Limestone (Avignon, France origin), which was obtained by first dry grinding to a $d_{50}$ of between 40 to 50 µm, and subsequently wet grinding this dry-ground product in water, wherein 1.05 wt.-% of a sodium and magnesium-neutralized polyacrylate (Mw=6 000 g/mol, Mn=2 300 g/mol) "PAAN-aMg" in respect to dry calcium carbonate were added. The wet grinding took place in a 1.4-litre vertical attritor mill at a weight solids content of 76.1% by weight under recirculation until:

98% by weight of the particles have a diameter<2 µm,

85% by weight of the particle have a diameter<1 µm

27% by weight of the particle have a diameter<0.2 µm.

The specific surface (BET) was 14.1 g/m².

0.75 mg polycarboxylate dispersant per m² of the dry mineral were contained. The anionic charge of the solids in the mineral material suspension was −111 µVal./g.

0.4 kg of this suspension are introduced in a 1-litre beaker having a diameter of 8 cm. A Pendraulik tooth disc stirrer is introduced in the beaker such that the stirrer disk is located approximately 1 cm above the bottom of the beaker. The initial suspension conductivity and pH values are reported in table 1 below. Under stirring at 5000 rpm, MIPA is added in the indicated amount to the suspension over a period of one minute. After completed addition, the suspension is stirred for additional 5 minutes. The suspension pH, the conductivity and the viscosity were determined after 1 hour of storage. The pH and conductivity of the 6000 ppm sample was again measured after 24 h.

TABLE 1

| Amount of MIPA (based on water phase) | Weight of Suspension/ water phase | MIPA (0.96 g/ml at 25° C.) | Brookfield Viscosity 100 rpm Spindle 3 | | | | Conductivity |
|---|---|---|---|---|---|---|---|
| ppm | g | µl | 5 sec | 1 min | 2 min | pH | µS/cm |
| 0 | 400 g/ 95.6 g | 0 | 220 | 221 | 222 | 10.4 | 1002 |
| 500 | 400 g/ 95.6 g | 50 µl | 219 | 219 | 221 | 10.6 | 1009 |
| 1000 | 400 g/ 95.6 g | 100 µl | 222 | 222 | 223 | 10.7 | 1021 |
| 2000 | 400 g/ 95.6 g | 200 µl | 221 | 221 | 221 | 10.8 | 1036 |
| 3000 | 400 g/ 95.6 g | 300 µl | 221 | 220 | 220 | 10.9 | 1046 |
| 4000 | 400 g/ 95.6 g | 400 µl | 218 | 218 | 218 | 11.0 | 1041 |
| 6000 | 400 g/ 95.6 g | 600 µl | 215 | 216 | 217 | 11.1 | 1050 |
| after 24 hours: | | | | | | 11.1 | 1046 |

The weight ratio of MIPA to PAA dispersant ranges from 1:20 (500 ppm MIPA) to 1:2.5 (6000 ppm MIPA).

Figure 1:
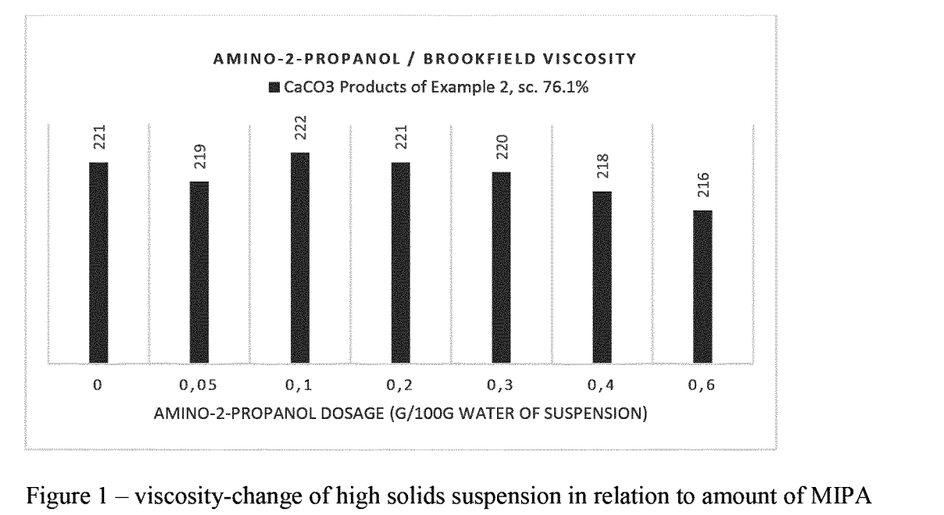
FIGS. 1 (viscosity change), 2 (pH change) and 3 (conductivity change) depict the results of Example 2.
Figure 2:
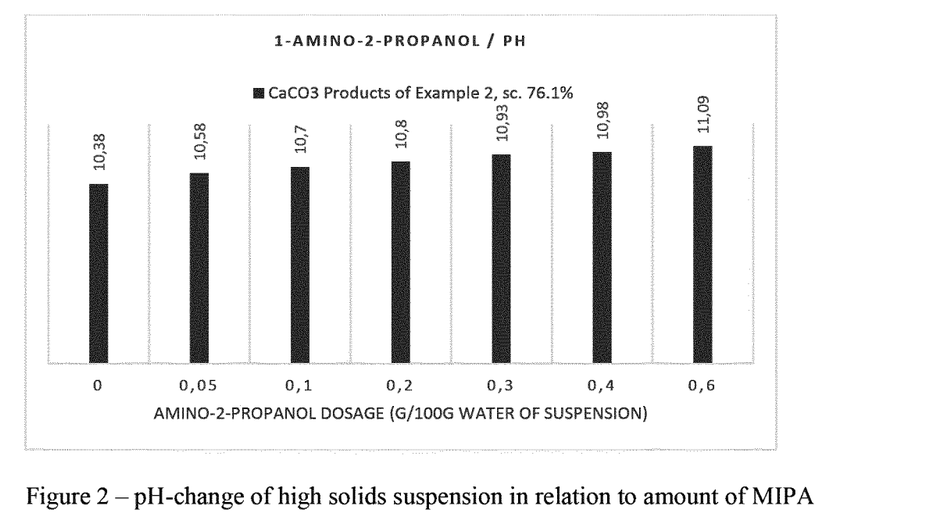
Figure 3:
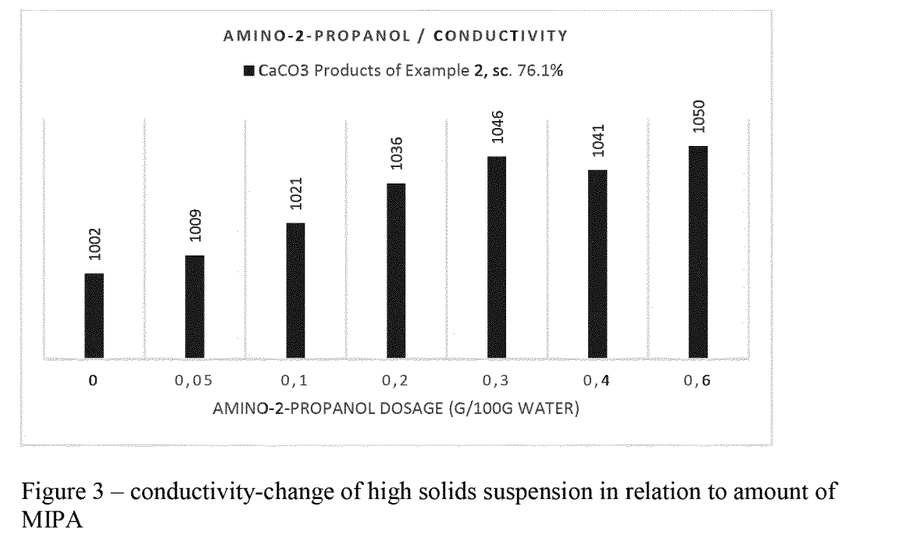

The corresponding results are reflected by FIGS. 1, 2 and 3.

Example 3

A 0.4 kg of HYDRAGLOSS 90 SENK Kaolin clay slurry (OMYA/KaMin, Macon, Ga. 31217, USA) at 72-73 wt.-% solids having the following physical properties was used:

TABLE 2

| <5 µm | wt.-% | 99.2 |
|---|---|---|
| <2 µm | % | 98.6 |
| <1 µm | % | 97.3 |
| <0.5 µm | % | 89.3 |
| <0.2 µm | % | 53.8 |
| Median ($D_{50}$) | µm | 0.206 |
| Specific Surface | m²/g | 21.20 |

The suspension contains approx. 0.5 wt.-% of sodium polyacrylate dispersant on dry Kaolin clay, resulting in 0.23 mg polycarboxylate dispersant per m² of the dry mineral. 0.4 kg of this suspension are introduced in a 1-litre beaker having a diameter of 8 cm. A Pendraulik tooth disc stirrer is introduced in the beaker such that the stirrer disk is located approximately 1 cm above the bottom of the beaker. The initial suspension conductivity and pH values are reported in table 3 below. Under stirring at 5000 rpm, MIPA is added in the indicated amount to the suspension over a period of one minute. After completed addition, the suspension is stirred for additional 5 minutes. The suspension pH, the conductivity and the viscosity were determined after 1 hour of storage.

TABLE 3

| Amount of MIPA (based on water phase) | Weight of Suspension/ water phase | MIPA (0.96 g/ml at 25° C.) | Brookfield Viscosity 100 rpm Spindle 3 | | | | Conductivity |
|---|---|---|---|---|---|---|---|
| ppm | g | µl | 5 sec | 1 min | 2 min | pH | µS/cm |
| 0 | 400/ 110 water | 0 | 560 | 565 | 580 | 8.1 | 2570 |

TABLE 3-continued

| Amount of MIPA (based on water phase) | Weight of Suspension/ water phase | MIPA (0.96 g/ml at 25° C.) | Brookfield Viscosity 100 rpm Spindle 3 | | | | Conductivity |
|---|---|---|---|---|---|---|---|
| ppm | g | µl | 5 sec | 1 min | 2 min | pH | µS/cm |
| 6000 | 400/ 110 water | 680 µl | 470 | 478 | 485 | 10.3 | 2490 |

Example 4

This example implements a natural calcium carbonate of Dolomitic Marble (Kärnten, Austria origin) obtained by first dry grinding to a $d_{50}$ of between 40 to 50 µm, and subsequently wet grinding this dry-ground product in water, wherein 0.75% by weight, based on dry weight of the mineral material, of a sodium and magnesium-neutralized polyacrylate (Mw=6 000 g/mol, Mn=2 300 g/mol) were added. The wet grinding took place in 1.4-litre vertical attritor mill at a weight solids content of 78% by weight under recirculation within the mill until approximately 95% by weight of the particles have a diameter <2 µm. The resulting physical properties are as follows:
Solids content after grinding: 78.1 wt.-%
97% by weight of the particles have a diameter <2 µm,
80% by weight of the particle have a diameter <1 µm
24% by weight of the particle have a diameter <0.2 µm.
The specific surface (BET) was 15.7 g/m² resulting in 0.48 mg polycarboxylate dispersant per m² of the mineral material.
The anionic charge of the solids in the mineral material suspension was −80 µVal./g.
2100 mg of different alkanolamine additives per kg of aqueous phase of the suspension were added to 510 ml of aqueous phase of suspension (corresponding to ~835 g of the suspension). For one sample no additive was used. The suspensions were placed in a filtering unit of an API Low Pressure, Low Temperature (LPLT) Filter Press of the Series 300 LPLT Filter Press (Basic LPLT Filter Press Assembly Part No. 207127) using compressed air. At the bottom of the cup, a paper filter (Ø9 cm) for use with LPLT filter press (part No. 206051) was used. The cup was closed and the suspension was filtered under a pressure of 45 psi till 35 to 40 ml of filtrate were obtained.
The obtained filtrates were used in the foaming test described below as well as for determining the surface tension in Example 5.
Foaming Test
The foaming tendency of the respective suspensions is an important parameter for high turbulence applications and was investigated with the filtrates obtained as describes above. Foaming was evaluated by adding 10 ml of the respective aqueous phase/filtrate in a 20 ml graduated tube (1 ml scale), closing the tube and shaking it vigorously by hand for 1 min. The height of the generated foam was determined after 10 s and after 1 min and after 10 min (by taking a reading of the scaling of the tube). The results are shown in table 3 below.

TABLE 4

| Additive | 10 sec/ml foam | 1 min/ml foam | 10 min/ml foam |
|---|---|---|---|
| Filtrate without additive | <1 ml | <1 ml | <1 ml |
| Filtrate with 2100 mg/kg MEA | 3.0 ml | 2.5 ml | 1.5 ml |
| Filtrate with 2100 mg/kg AMP | 0.2 ml | 0.2 ml | <0.1 ml |
| Filtrate with 2100 mg/kg MIPA | 0.5 ml | 0.2 ml | <0.1 ml |

As can be gathered from table 4, the inventive additive MIPA has an unexpected low foaming tendency, whereas e.g. MEA shows significant foaming properties.

Example 5

In order to investigate the wetting properties of the additive, the surface tension of the aqueous phase of the respective suspensions containing different additives was measured. A lower surface tension is indicative for a better wettability of the mineral material surface. For the measurement of the surface tension the filtrates/aqueous phase of the respective samples of Example 4 were used. The surface tension was measured in triplicate at 23° C.±1° C. on a Kriiss "Force Tensiometer K100" (Serial Nr. 30001438) with the plate method (Wilhelmy-Method) (Plate PLOT/ 38371).
Procedure Control:
Detection speed: 10 mm/min
Detection sensitivity: 0.005 g
Immersion depth: 2.00 mm
Acquisition: Linear
Max. Meas. Time: 60 s.
For each measurement, the measuring process is repeated until a stable (deviation of less than 0.1 mN/m within 5 subsequent measurements) value is obtained (requires usually 5 to 20 repetitions).
Values for mean: 3
Standard deviation: 0.1 mN/m
A quality test (QTI) was performed with deionized water prior to the measurements. The results are shown in table 5 below.

TABLE 5

| | Surface tension measured at room temperature (23° C., mN/m) | | | | |
|---|---|---|---|---|---|
| Sample | Measurement 1 | Measurement 2 | Measurement 3 | average | standard deviation |
| QTI (water) | 72.16 | 72.08 | 72.32 | 72.19 | 0.12 |
| Filtrate without additive | 68.93 | 68.93 | 68.78 | 68.88 | 0.09 |
| Filtrate with 2100 mg/kg MEA | 50.94 | 50.96 | 50.76 | 50.89 | 0.11 |
| Filtrate with 2100 mg/kg AMP | 62.19 | 61.62 | 61.46 | 61.76 | 0.38 |
| Filtrate with 2100 mg/kg MIPA | 59.18 | 58.45 | 58.16 | 58.60 | 0.55 |

The inventive MIPA-additive significantly lowers the surface tension of the aqueous phase of the suspension and, thus, provides improved wettability to the surface of the mineral material.

The invention claimed is:

1. An aqueous suspension including an additive comprising a primary alkanolamine, the aqueous suspension containing 48 to 84 wt.-%, based on the total weight of the suspension, of at least one mineral material for increasing the suspension pH by at least 0.3 pH units and/or for increasing the wettability of the at least one mineral material in the suspension,
wherein the at least one mineral material has a density of 2.0 to 3.0 g/cm$^3$;
wherein the primary alkanolamine has at most 4 carbon atoms, has a surface tension of 30 to 40 mN/m at 23° C., has a melting point of less than 5° C. and a boiling point of less than 163° C.,
wherein the suspension contains at least one polycarboxylate dispersant in an amount of 0.1 to 1.5 wt.-%, based on the dry mineral material and
wherein the primary alkanolamine is added in an amount of from 200 to 10 000 mg per kg of the aqueous phase of said suspension and
wherein the weight ratio of primary alkanolamine to polycarboxylate dispersant is from 1:2 to 1:25, yielding a suspension pH of 8.0 to 11.5.

2. The aqueous suspension according to claim 1, characterised in that the primary alkanolamine is 1-amino-2-propanol.

3. The aqueous suspension according to claim 1, characterised in that the at least one mineral material is selected from the group consisting of calcium carbonate, kaolin, clay, mica, talc.

4. The aqueous suspension according to claim 1, characterised in that the suspension conductivity change caused by the addition of the additive is less than 100 µS/cm/pH unit.

5. The aqueous suspension according to claim 1, characterised in that said suspension has a conductivity of between 100 and 3000 µS/cm.

6. The aqueous suspension according to claim 1, characterised in that the suspension viscosity after addition of the additive is in the range of 50 to 1500 mPas at 25° C.

7. The aqueous suspension according to claim 1, characterised in that said primary alkanolamine is added to said suspension in an amount to increase the pH of the suspension by at least 0.4 pH units.

8. The aqueous suspension according to according to claim 1, characterised in that the additive consists of 1-amino-2-propanol and water.

9. The aqueous suspension according to claim 1, characterised in that the aqueous suspension contains 50 to 82 wt.-%, based on the total weight of the suspension, of at least one mineral material.

10. The aqueous suspension according to claim 1, characterised in that said additive is added prior to, during or after, a step of grinding said at least one mineral material.

11. The aqueous suspension according to claim 1, characterised in that the aqueous phase of the suspension has a surface tension of 55 to 65 mN/m at 23° C.

12. A method for increasing the pH of an aqueous suspension containing 48 to 84 wt.-%, based on the total weight of the suspension, of at least one mineral material characterised in that the method involves the step of adding a liquid additive comprising a primary alkanolamine to the suspension in an amount of from 200 to 10 000 mg, per kg of the aqueous phase of said suspension, so that the pH of the suspension is increased by at least 0.3 pH units yielding a suspension pH of 8.0 to 11.5, wherein the at least one mineral material has a density of 2.0 to 3.0 g/cm$^3$ and wherein the primary alkanolamine has at most 4 carbon atoms, has a surface tension of 30 to 40 mN/m at 23° C., has a melting point of less than 5° C. and a boiling point of less than 163° C. and wherein the suspension contains at least one polycarboxylate dispersant in an amount of 0.1 to 1.5 wt.-%, based on the dry mineral material.

13. A method for increasing the wettability of at least one mineral material in an aqueous suspension containing 48 to 84 wt.-%, based on the total weight of the suspension, of the at least one mineral material characterised in that the method involves the step of adding a liquid additive comprising a primary alkanolamine to the suspension in an amount of from 200 to 10 000 mg, per kg of the aqueous phase of said suspension, wherein the at least one mineral material has a density of 2.0 to 3.0 g/cm$^3$ and wherein the primary alkanolamine has at most 4 carbon atoms, has a surface tension of 30 to 40 mN/m at 23° ° C., has a melting point of less than 5° C. and a boiling point of less than 163° C. and wherein the suspension contains at least one polycarboxylate dispersant in an amount of 0.1 to 1.5 wt.-%, based on the dry mineral material.

14. The method according to claim 12, characterised in that the pH of the suspension is increased by at least 0.3 pH units yielding a suspension pH of 8.0 to 11.5 and the wettability of the at least one mineral material in the aqueous suspension is increased.

15. The method according to claim 12, characterised in that the at least one mineral material is selected from the group consisting of calcium carbonate, kaolin, clay, mica, and talc.

16. The method according to claim 12, characterised in that the primary alkanolamine is 1-amino-2-propanol.

17. The method according to claim 12, characterised in that the suspension conductivity change caused by the addition of the additive is less than 100 µS/cm/pH unit.

18. he method according to claim 12, characterised in that the obtained suspension is added to a paint composition, a paper coating composition or a paper composition.

19. An aqueous suspension obtainable by the method according to claim 12.

20. The aqueous suspension according to claim 19, wherein the aqueous phase of the obtained suspension has a surface tension of 53 to 65 mN/m at 23° C. and/or the solids in the mineral suspension have an anionic charge density, wherein the charge of the solids in the mineral material suspension is µ20 to µ200 µVal/g.

21. The aqueous suspension according to claim 1, characterised in that the at least one mineral material is selected from the group consisting of natural calcium carbonate, synthetic calcium carbonate and mixtures thereof.

22. The aqueous suspension according to claim 8, characterised in that the additive contains at least 90 wt.-% 1-amino-2-propanol.

* * * * *